United States Patent
Li et al.

(10) Patent No.: US 10,437,996 B1
(45) Date of Patent: Oct. 8, 2019

(54) CLASSIFYING SOFTWARE MODULES UTILIZING SIMILARITY-BASED QUERIES

(71) Applicant: EMC IP Holding Company LLC, Hopkinton, MA (US)

(72) Inventors: Zhou Li, Malden, MA (US); Martin Rosa, Quebec (CA); Zohar Duchin, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 164 days.

(21) Appl. No.: 15/657,812

(22) Filed: Jul. 24, 2017

(51) Int. Cl.
*H04L 29/06* (2006.01)
*G06F 21/56* (2013.01)
*G06F 16/245* (2019.01)
*G06F 16/28* (2019.01)
*G06F 16/22* (2019.01)

(52) U.S. Cl.
CPC ........ *G06F 21/562* (2013.01); *G06F 16/2255* (2019.01); *G06F 16/245* (2019.01); *G06F 16/285* (2019.01); *H04L 63/20* (2013.01); *G06F 2221/033* (2013.01)

(58) Field of Classification Search
CPC ... G06F 21/562; G06F 2221/033; H04L 63/20
See application file for complete search history.

(56) References Cited

U.S. PATENT DOCUMENTS 9,223,554 B1 * 12/2015 Lawson .................. G06F 8/54
9,386,037 B1 * 7/2016 Hunt .................. H04L 63/1483

OTHER PUBLICATIONS

Ciprian Oprisa—A MinHash Approach for Clustering Large Collections of Binary Programs (obtained on: Mar. 1, 2019 fr https://www.researchgate.net/publication/308728648_A_MinHash_Approach_for_Clustering_Large_Collections_of_Binary_Programs (Year: 2015).*
Ciprian Oprisa—Locality Sensitive Hashing Optimizations for Fast Malware Clustering (Obtained on:Mar. 2019 as previous work of Oprisa above) (Year: 2014).*

(Continued)

*Primary Examiner* — Tri M Tran
(74) *Attorney, Agent, or Firm* — Ryan, Mason & Lewis, LLP

(57) ABSTRACT

A method includes preparing a representation of data associated with a plurality of software modules, the representation comprising similarity-based hashing of signatures constructed from a first subset of features of the plurality of software modules. The method also includes performing a similarity-based query utilizing the similarity-based hashing of signatures to identify one or more of the plurality of software modules as candidate software modules matching a received seed software module. The method further includes computing distances between the candidate software modules and the seed software module utilizing a second subset of features of the plurality of software modules, classifying one or more of the candidate software modules as a designated type based on the computed distances, generating a notification comprising a list of the classified candidate software modules, and controlling access by one or more client devices associated with an enterprise to the candidate software modules in the list.

20 Claims, 13 Drawing Sheets

(56) References Cited

OTHER PUBLICATIONS

Verizon Enterprise, "Verizon Data Breach Investigations Report (DBIR)," http://www.verizonenterprise.com/DBIR/2015/, 2015, 2 pages.

M. Bailey et al., "Automated Classification and Analysis of Internet Malware," Proceedings of the 10th International Conference on Recent Advances in Intrusion Detection (RAID), Sep. 5-7, 2007, pp. 178-197.

U. Bayer et al., "Scalable Behavior-Based Malware Clustering," Network and Distributed System Security Symposium (NDSS), Feb. 2009, 18 pages, vol. 9.

X. Hu et al., "DUET: Integration of Dynamic and Static Analyses for Malware Clustering with Cluster Ensembles," Proceedings of the 29th Annual Computer Security Applications Conference (ACSAC), Dec. 9-113, 2013, pp. 79-88.

X. Hu et al., "MutantX-S: Scalable Malware Clustering Based on Static Features," Proceedings of the USENIX Conference on Annual Technical Conference (ATC), Jun. 26-28, 2013, pp. 187-198.

Mandiant, "Mandiant Exposes APT1—One of China's Cyber Espionage Units & Releases 3,000 Indicators," www.fireeye.co/blog/threat-research/2013/02/mandiant-exposes-apt1-chinas-cyber-espionage-units.html, Feb. 2013, 1 page.

Mandiant, "The OpenIOC Framework," http://www.openioc.org, 2016, 3 pages.

M. Neugschwandtner et al., "FORECAST: Skimming Off the Malware Cream," Proceedings of the 27th Annual Computer Security Applications Conference (ACSAC), Dec. 5-9, 2011, pp. 11-20.

Panda Security, Pandalabs Annual Report 2014, http://press.pandasecurity.com, Jun. 11, 2014, 37 pages.

R. Perdisci et al., "Behavioral Clustering of HTTP-Based Malware and Signature Generation Using Malicious Network Traces," Proceedings of the 7th USENIX Conference on Networked Systems Design and Implementation (NSDI), Apr. 28-30, 2010, 14 pages.

A. Rajaraman et al., Mining of Massive Datasets (Chapter 3), Cambridge University Press, 2011, pp. 73-130.

K. Rieck et al., "Automatic Analysis of Malware Behavior Using Machine Learning," Journal of Computer Security, Dec. 2011, pp. 639-688, vol. 19, No. 4.

stopbadware.org, "What is Badware?" https://www.stopbadware.org/badware, 2016, 2 pages.

\* cited by examiner

| FEATURE | $M_1$ | $M_2$ |
|---|---|---|
| Non-zero IOCs | $IOC_1, IOC_{10}, IOC_{15}, IOC_{20}, IOC_{31}, IOC_{41},$ $IOC_{47}, IOC_{100}, IOC_{150}, IOC_{151}$ | $IOC_1, IOC_{10}, IOC_{15}, IOC_{20}, IOC_{31}, IOC_{41},$ $IOC_{47}, IOC_{100}, IOC_{150}, IOC_{151}, IOC_{160}$ |
| Description | ofeksiko | uhwsiifb |
| CompanyName | | |
| Extension | .EXE | .EXE |
| FileName | ofesiko.exe | uhwsiifb.exe |
| Filesize | 156672 | 159744 |
| SectionNames | .text, .rsrc, .reloc | .text, .rsrc, .reloc |
| ImportedDLLs | mscoree.dll | mscoree.dll |

11 non-zero IOCs, 1 different → $\boxed{0} + \boxed{0}$

CompanyName are both empty $$\text{Distance} = \frac{1 + 1 + 0 + 1 + 0.019 + 0 + 0 + 0}{11 + 1 + 1 + 1 + 1 + 1 + 0 + 0} = 0.178$$

FIG. 5

| Seed | $TH_{L1}$ | $TH_{L2}$ | BL | GL | WL | UBad | UGood | Total |
|---|---|---|---|---|---|---|---|---|
| BL | 0.7 | 0.45 | 235 | 14 | 0 | 117 | 169 | 535 |
| BL | 0.4 | 0.6 | 239 | 17 | 0 | 105 | 42 | 403 |

FIG. 6

| Seed | $TH_{L1}$ | $TH_{L2}$ | BL | GL | WL | UBad | UGood | Total |
|------|-----------|-----------|-----|-----|-----|------|-------|-------|
| GL | 0.7 | 0.8 | 5 | 392 | 0 | 108 | 88 | 593 |

FIG. 9

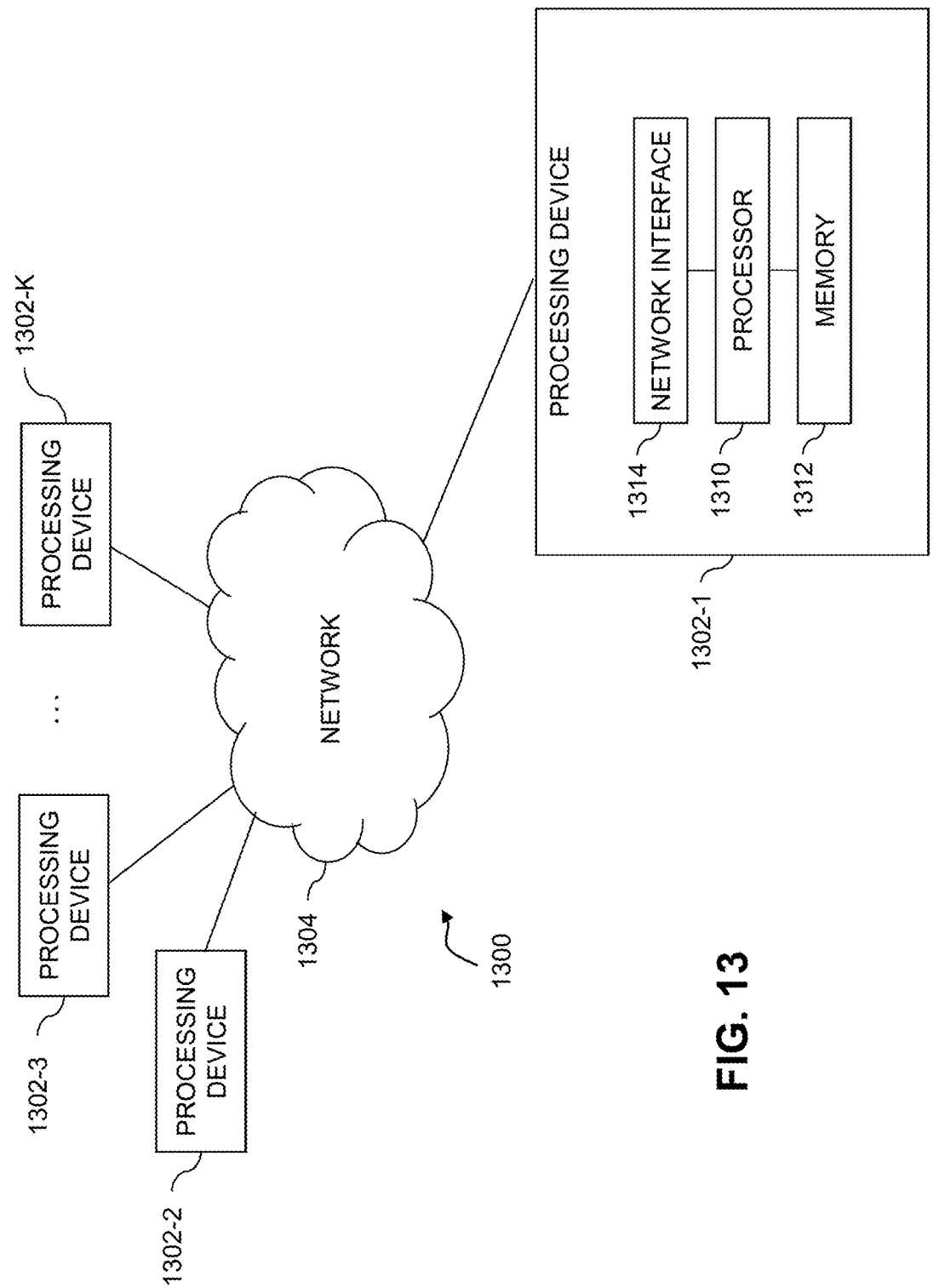

CLASSIFYING SOFTWARE MODULES UTILIZING SIMILARITY-BASED QUERIES

FIELD

The field relates generally to information security, and more particularly to detection of security threats in computer networks.

BACKGROUND

Various entities are subject to different types of security threats. Some security threats relate to networking and computer security for client devices used by members of an entity, such as a business, organization or other enterprise. Security threats of this type include malware and potentially unwanted programs (PUPs) such as adware. Malware and PUPs can pose a threat to an individual user and that user's devices, as well as possibly threatening an entity associated with the user. The emergence of exploit toolkits permits attackers to easily create new malware variants that can avoid current detection technologies, such as those based on signature matching or simple binary analysis. Users or members of an entity can become victims of malware-based attacks through a variety of different infection vectors including but not limited to visiting suspicious web sites, connecting machines or devices to untrusted networks, using infected universal serial bus (USB) drives, etc.

SUMMARY

Illustrative embodiments of the present invention provide techniques for the classification of software modules, including potentially malicious software modules such as malware and PUPs.

In one embodiment, a method comprises preparing a representation of data associated with a plurality of software modules, the representation comprising similarity-based hashing of signatures constructed from a first subset of features of the plurality of software modules. The method also comprises receiving a seed software module and performing a similarity-based query utilizing the similarity-based hashing of signatures constructed from the first subset of features to identify one or more of the plurality of software modules as candidate software modules matching the seed software module. The method further comprises computing distances between the candidate software modules and the seed software module utilizing a second subset of features of the plurality of software modules, classifying one or more of the candidate software modules as a designated software module type based on the computed distances, generating a notification comprising a list of the candidate software modules classified as the designated software module type, and controlling access by one or more client devices associated with an enterprise to one or more of the candidate software modules in the list. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

BRIEF DESCRIPTION OF THE DRAWINGS

FIG. 5 shows an example of a distance computation for a pair of software modules in an illustrative embodiment.

FIG. 6 shows a table of the number of software modules returned after querying blacklisted seed software modules in an illustrative embodiment.

FIG. 9 shows a table of the number of software modules returned after querying graylisted seed software modules in an illustrative embodiment.

FIGS. 12 and 13 show examples of processing platforms that may be utilized to implement at least a portion of the FIG. 1 system.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
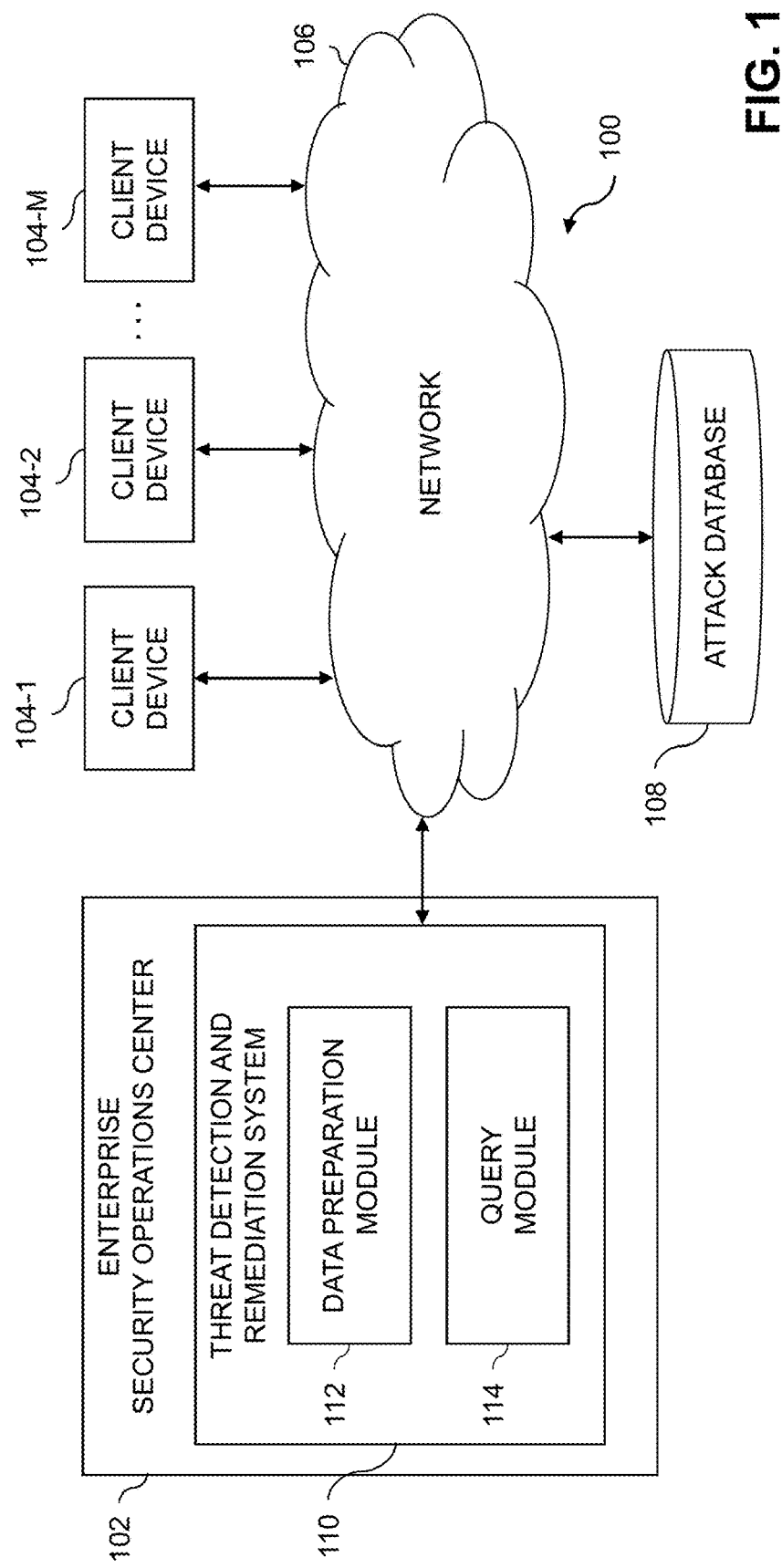
FIG. 1 is a block diagram of an information processing system for classifying software modules in an illustrative embodiment of the invention.

FIG. 1 shows an information processing system 100 configured in accordance with an illustrative embodiment. The information processing system 100 is assumed to be built on at least one processing platform and provides functionality for classifying software modules utilizing similarity-based queries, such as locality-sensitive hashing (LSH) queries. In this embodiment, the system 100 more particularly comprises an enterprise security operations center (SOC) 102 and a plurality of client devices 104-1, 104-2, . . . 104-M, collectively referred to herein as client devices 104. The client devices 104 are coupled to a network 106. Also coupled to the network 106 is an attack database 108, which may store information relating to previously classified software modules.

Software modules, such as executables (EXEs) and dynamic link library (DLL) modules or DLLs, may be malicious or represent PUPs such as adware. The term "badware" is used herein to refer to both malware and PUPs. While various embodiments are described below in the context of classifying EXEs and DLLs, embodiments are not limited solely to classifying these types of software modules. The techniques described below in the context of EXE and DLL software modules may be adapted for use with other types of software modules or more generally other types of files that are potentially badware.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The attack database 108, as discussed above, is configured to store and record information relating to threats and attacks including information related to previously classified software modules. The attack database 108 may, in some embodiments, more particularly store a blacklist of known malicious or potentially malicious software modules, as well as other information characterizing known malicious or potentially malicious software modules including previous patterns of attack used by known malicious or potentially malicious software modules. The attack database 108 in some embodiments also stores a graylist of known or suspected PUPs, as well as other information characterizing known or suspected PUPs including previous patterns of attack used by known or suspected PUPs. In other embodiments, various additional or alternative information may be stored in attack database 108, such as a whitelist of known benign previously classified software modules or information associated with known benign software modules.

The attack database 108 in some embodiments is implemented using one or more storage devices associated with the enterprise SOC 102. Such storage devices may comprise, for example, storage products such as VNX® and Symmetrix VMAX® storage arrays, software-defined storage products such as ScaleIO™ and ViPR®, flash-based storage arrays such as Unity, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. A variety of other storage products may be utilized to implement at least a portion of the storage devices associated with the enterprise SOC 102.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

In the present embodiment, alerts or notifications generated by a threat detection and remediation system 110 of the enterprise SOC 102 are provided over network 106 to client devices 104, or to a system administrator, information technology (IT) manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 110. For example, a given security or host agent may comprise a mobile telephone equipped with a mobile application configured to receive alerts from the enterprise SOC 102 or the threat detection and remediation system 110 and to provide an interface for the security agent to select particular remedial measures for responding to the alert or notification. Examples of such remedial measures may include blocking access to one or more badware software modules, removing badware software modules from one or more of the client devices 104, requiring badware software modules to be run in a sandboxed or other protected environment on one or more of the client devices 104, requiring user input or authentication to obtain or run the badware software modules, triggering further review of software modules classified as badware, etc.

It should be noted that a "security agent" or "host agent" as these terms are generally used herein may comprise an automated entity, such as a software entity running on a processing device. Accordingly, a security agent or host agent need not be a human entity.

As shown in FIG. 1, the enterprise SOC 102 comprises threat detection and remediation system 110. As will be described in further detail below, the threat detection and remediation system 110 is configured to classify software modules such as badware.

Although shown as an element of the enterprise SOC 102 in this embodiment, the threat detection and remediation system 110 in other embodiments can be implemented at least in part externally to the enterprise SOC 102, for example, as a stand-alone server, set of servers or other type of system coupled to the network 106. In some embodiments, the threat detection and remediation system 110 may be implemented at least in part within one or more of the client devices 104.

The threat detection and remediation system 110 in the FIG. 1 embodiment is assumed to be implemented using at least one processing device. Each such processing device generally comprises at least one processor and an associated memory, and implements one or more functional modules for controlling certain features of the threat detection and remediation system 110. In the FIG. 1 embodiment, the threat detection and remediation system 110 comprises a data preparation module 112 and a query module 114.

The data preparation module 112 in some embodiments is configured to prepare a representation of data associated with a plurality of software modules, the representation comprising similarity-based hashing of signatures constructed from a first subset of features of the plurality of software modules. The query module 114 in some embodiments is configured to receive a seed software module, to perform a similarity-based query utilizing the similarity-based hashing of signatures constructed from the first subset of features to identify one or more of the plurality of software modules as candidate software modules matching the seed software module, to compute distances between the candidate software modules and the seed software module utilizing a second subset of features of the plurality of software modules, to classify one or more of the candidate software modules as a designated software module type based on the computed distances, to generate a notification comprising a list of the candidate software modules classified as the designated software module type, and to provide the notification over at least one network to one or more client devices associated with an enterprise.

Additional details regarding the data preparation module 112 and the query module 114 will be described in further detail below with respect to FIGS. 2-11.

It is to be appreciated that the particular arrangement of the enterprise SOC 102, threat detection and remediation system 110, data preparation module 112 and query module 114 illustrated in the FIG. 1 embodiment is presented by way of example only, and alternative arrangements can be used in other embodiments. As discussed above, for example, the enterprise SOC 102, threat detection and remediation system 110, data preparation module 112 and/or query module 114 may in some embodiments be implemented internal to one or more of the client devices 104. As another example, the functionality associated with the data preparation module 112 and the query module 114 may be combined into one module, or separated across more than two modules with the multiple modules possibly being implemented with multiple distinct processors or processing devices.

At least portions of the data preparation module 112 and the query module 114 may be implemented at least in part in the form of software that is stored in memory and executed by a processor.

It is to be understood that the particular set of elements shown in FIG. 1 for classification of software modules is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 110 may be implemented external to enterprise SOC 102, such that the enterprise SOC 102 can be eliminated.

In some embodiments, the threat detection and remediation system 110 may be part of or otherwise associated with a system other than the enterprise SOC 102, such as, for example, a critical incident response center (CIRC), a security analytics system, a security information and event management (SIEM) system, etc.

The threat detection and remediation system 110 and other portions of the system 100, as will be described in further detail below, may be implemented at least in part using one or more processing platforms including public or private cloud infrastructure, or other distributed virtual infrastructure.

Figure 2:
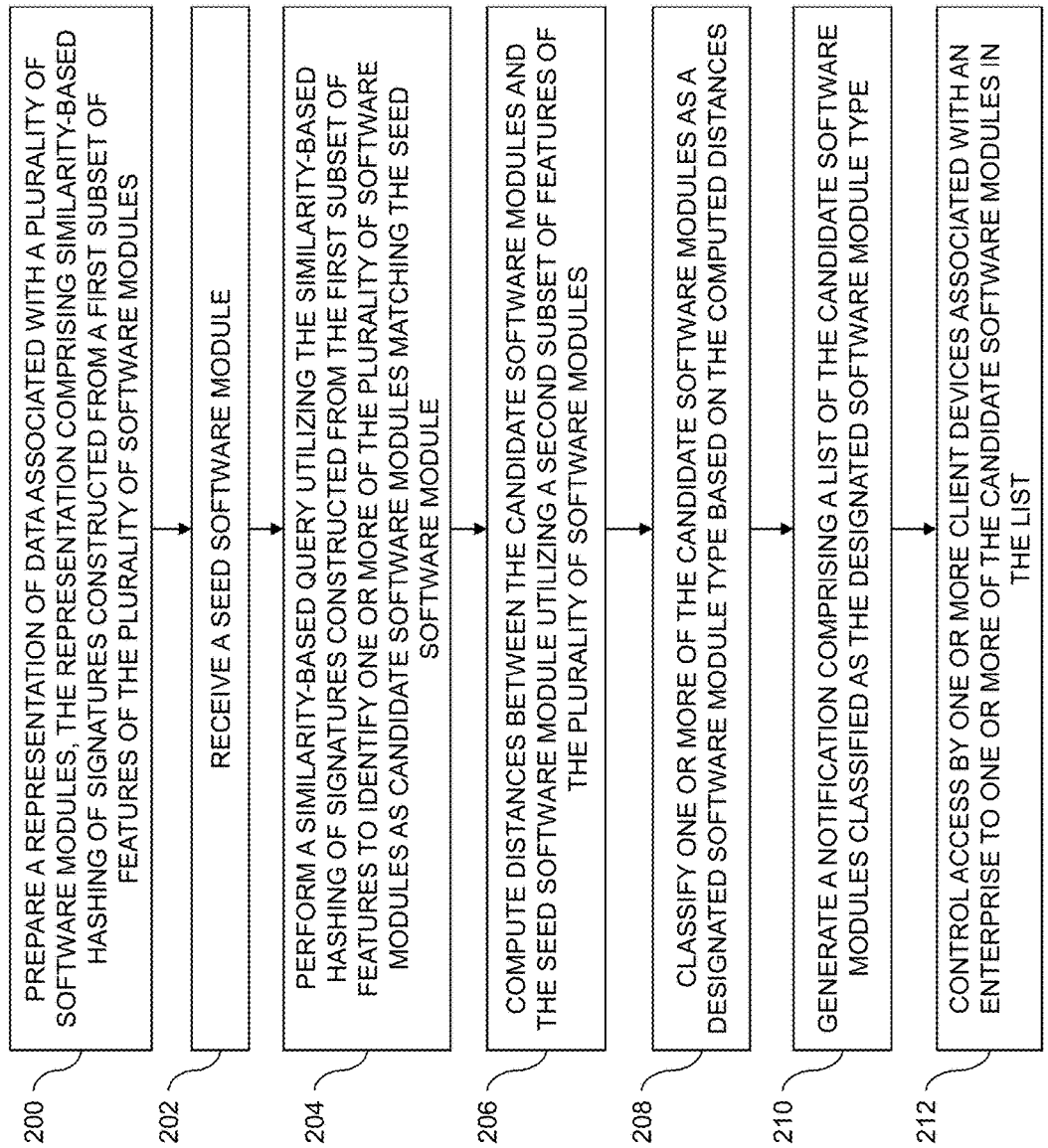
FIG. 2 is a flow diagram of an exemplary process for classification of software modules in an illustrative embodiment.

An exemplary process for classification of software modules will now be described in more detail with reference to the flow diagram of FIG. 2. It is to be understood that this particular process is only an example, and that additional or alternative processes for classification of software modules can be carried out in other embodiments.

In this embodiment, the process includes steps 200 through 212. These steps are assumed to be performed by the threat detection and remediation system 110 utilizing the data preparation module 112 and the query module 114. The process begins with step 200, preparing a representation of data associated with a plurality of software modules, the representation comprising similarity-based hashing of signatures constructed from a first subset of features of the plurality of software modules.

Step 200, in some embodiments, includes receiving data associated with the plurality of software modules from a plurality of client devices associated with the enterprise, such as the client devices 104. The received data is filtered to remove one or more of the plurality of software modules that do not trigger one or more specified conditions and that are not of one or more specified types. The one or more specified conditions may comprise triggering a threshold number of indicators of compromise (IOCs). The one or more specified types may comprise EXEs and DLLs.

In some embodiments, preparing the representation of data in step 200 includes building a characteristic matrix having two or more rows each corresponding to one of the first subset of features, and converting each column of the characteristic matrix into a Minhash signature through a designated number of permutations. The first subset of the plurality of features may comprise at least one feature having a binary value range and at least one feature having an associated integer value range, and wherein each feature in the first subset having a binary value range is associated with a single row in the characteristic matrix and each feature in the first subset having an integer value range is associated with two or more rows of the characteristic matrix corresponding to different integer values in its associated integer value range. Step 200 may further include performing locality-sensitive hashing by building two or more bands of consecutive components of the Minhash signatures, each band comprising a concatenation of string values of two or more consecutive components of the Minhash signatures.

The process continues with step 202, receiving a seed software module. In some cases, prior to proceeding with step 204, the plurality of software modules is filtered to remove one or more of the plurality of software modules having one or more defined metadata types that do not match corresponding metadata types of the seed software module. The one or more defined metadata types may comprise at least one of a module type, a module platform, and a certificate owner.

In step 204, a similarity-based query is performed utilizing the similarity-based hashing of signatures constructed from the first subset of features to identify one or more of the plurality of software modules as candidate software modules matching the seed software module. Performing the similarity-based query may comprise performing a locality-sensitive hashing query matching one or more bands of the seed software module with corresponding bands of the plurality of software modules, and wherein the candidate software modules comprise respective ones of the plurality of software modules matching a designated threshold number of bands with the seed software module.

The process continues with step 206, computing distances between the candidate software modules and the seed software module utilizing a second subset of features of the plurality of software modules. Computing the distances between the candidate software modules and the seed software module in step 206 may comprise computing distances between the candidate software modules and the seed software module for respective features in the second subset of features and summing the distances to determine distance metrics for respective ones of the candidate software modules.

In step 208, one or more of the candidate software modules is classified as a designated software module type based on the computed distances. Step 208 may base the classification on determining that the distance metric for a given candidate module exceeds a designated threshold. The designated software module type may comprise malware, adware or other PUPs, benign, etc.

A notification is generated in step 210, the notification comprising a list of the candidate software modules classified as the designated software module type. Generating the notification in step 210 may include ordering the list of candidate software modules classified as the designated software module type based on the computed distances between the candidate software modules and the seed software module.

The process concludes with step 212, controlling access by one or more client devices associated with an enterprise to one or more of the candidate software modules in the list. Step 212 in some embodiments may comprise providing the notification over at least one network to one or more designated users of the enterprise. In some embodiments, controlling access in step 212 comprises modifying access by a given client device to a given one of the candidate software modules classified as the designated software module type. Modifying access by the given client device to a given one of the candidate software modules classified as the designated software module type comprises at least one of removing the given candidate software module from a memory or storage of the given client device, preventing the given client device from obtaining the given candidate software module, and causing the given candidate software module to be opened in a sandboxed application environment on the given client device.

Badware such as malware and adware or other PUPs may be generated at a staggering pace. According to some reports, more than 75 million new malware samples were generated in 2014 alone. With the help of exploit toolkits, badware can be built with little human effort and badware variants are able to evade detection technologies which rely on signature matching or simple binary analysis.

Mitigating badware may be an urgent issue for enterprises. In some cases, badware installed on employees' machines lead to advanced attacks, such as advanced persistent threats (APTs) or massive data breaches. As a result, many enterprises purchase and deploy endpoint solutions that monitor the activities of corporate machines (e.g., installed applications, running processes, service scheduled tasks, etc.). Security or host agents implemented on client devices 104 are examples of such endpoint solutions. To confine the impact on normal activities of employees or other users associated with an enterprise, such security or host agents tend to be lightweight, and the data collected by such agents tends to be utilized mainly for forensic purposes.

Illustrative embodiments provide techniques for leveraging such collected data to detect suspicious software modules representing potential badware. As discussed above, software modules may include executables or binary libraries such as DLLs. In some embodiments, endpoint data collected by security or host agents is analyzed to identify software modules similar to ones known to be badware. This is quite meaningful in an enterprise setting, where SOC analysts can discover some badware to be blacklisted or graylisted, but where many variants of such badware go undetected. Utilizing techniques described herein, such variants can be automatically detected, and remedial action may be prompted such as generating an alert or other notification which is sent to the SOC analysts. This can advantageously reduce the workload of the SOC analysts.

In some embodiments, techniques are designed to meet one or more of the following requirements. First, there should be accurate modeling on module similarity. Badware and their variants should be more likely grouped together, while legitimate software (e.g., false positives) should be kept away. As a result, approaches should use features that are stable among badware variants.

Second, result ordering should be provided to prioritize resources used for remedial action. Each prompted module may initiate generation of an alert or other notification which needs to be handled. Resources needed to handle such alerts may be limited or subject to a budget. For example, each analyst may only be able to investigate a certain number of suspicious software modules each day. As another example, computational or storage resources utilized in investigating suspicious software modules may be limited. As such, the prompted list of software modules, or alerts or notifications generated in response to detecting such software modules, should be correctly ordered such that software modules of higher ranking should be more likely to be malicious.

Third, detection of suspicious software modules should be highly efficient. Badware variants can infect multiple machines within a small period of time. For example, a spear-phishing campaign may deliver distinctive badware variants to all employees or users of a targeted enterprise. A single machine can be re-infected multiple times by different variants as well. Approaches should therefore allow for detection of variants substantially immediately after collection of endpoint data and identification of the original badware.

Clustering algorithms, like hierarchical clustering, may meet the first two requirements by assigning an unknown software module to the nearest known software module. Such approaches, however, may incur considerable overhead. The entire feature set of every pair of software modules in such approaches has to be examined for distance computation.

Since malware usually exhibits abnormal behaviors when executed on an infected host, behavioral features may be leveraged for clustering algorithms. Hierarchical clustering algorithms, for example, may group malware based on system state changes, such as files written and processes created, that are observed during runtime. Clustering algorithms may also capture malware behavior related to operating system (OS) objects, OS operations and network activities. Other clustering algorithms may exploit an observation that similar malware tends to produce similar network traffic, and thus cluster malware from collected network traces. Malware may also be clustered into families based on code instruction sequences extracted by parsing binary code. Generic unpacking techniques may be used to resolve issues raised by code obfuscation. Static and dynamic features may also be used for malware clustering, including separating malware into groups and ranking groups by their value to analysts.

Such clustering techniques, however, aim to cluster malware based on traces collected from a controlled environment consisting of virtual machines or other sandboxing, or from a code parser. These and other clustering algorithms cannot efficiently handle large or massive data volumes.

Thus, these and other clustering algorithms are not scalable when large numbers of software modules, such as millions of software modules, are encountered by an enterprise collectively. Some embodiments, as will be described in further detail below, provide such scalability by applying lightweight Minhash and LSH schema on a set of carefully selected features, which provides for effective detection of badware that is also capable of answering requests or queries within seconds.

Some embodiments therefore build a compact representation for each software module using a subset of features extracted by endpoint agents. The subset of features are selected such that their respective value ranges are limited or concentrated. For example, selected features may include Boolean features with limited value ranges, or other types of features whose values are concentrated in a particular range such as being within 0 and 32. The selected feature set is then converted into Minhash signatures, which are concise yet preserve similarity between software modules.

Given a training data set, such as seed software modules that are blacklisted or graylisted, LSH is used to find candidate software modules that are sufficiently similar to one or more of the seed software modules. After LSH, most software modules may be filtered out. For remaining software modules, the distances between the seed and candidate software modules are computed. The distance computation is more time-consuming, but also more precise. Since most software modules are filtered out after LSH, such an approach still provides high efficiency. Candidate software modules are then ordered based on the computed distances. Depending on resource constraints, some or all of the candidate software modules may prompt remedial action such as generating an alert or notification provided to a security analyst.

In some embodiments, the computed distances for the candidate software modules are compared with one or more threshold distance values to determine whether respective ones of the candidate software modules should prompt remedial action. In some cases, there is one threshold against which all computed distances are compared. In other cases, multiple different thresholds may be used. For example, different seed software modules may be assigned associated risk scores indicating threat level to an enterprise. Distance thresholds prompting remedial action may be set inversely to the associated risk scores for the seed software modules, such that a larger distance between a first candidate software module and a first seed software module having a comparatively high risk score may prompt remedial action while a smaller distance between a second candidate software module and a second seed software module having a comparatively low risk score may not prompt remedial action. In some embodiments, the ordering of candidate software modules may be weighted according to the risk scores of associated seed software modules.

Figure 3:
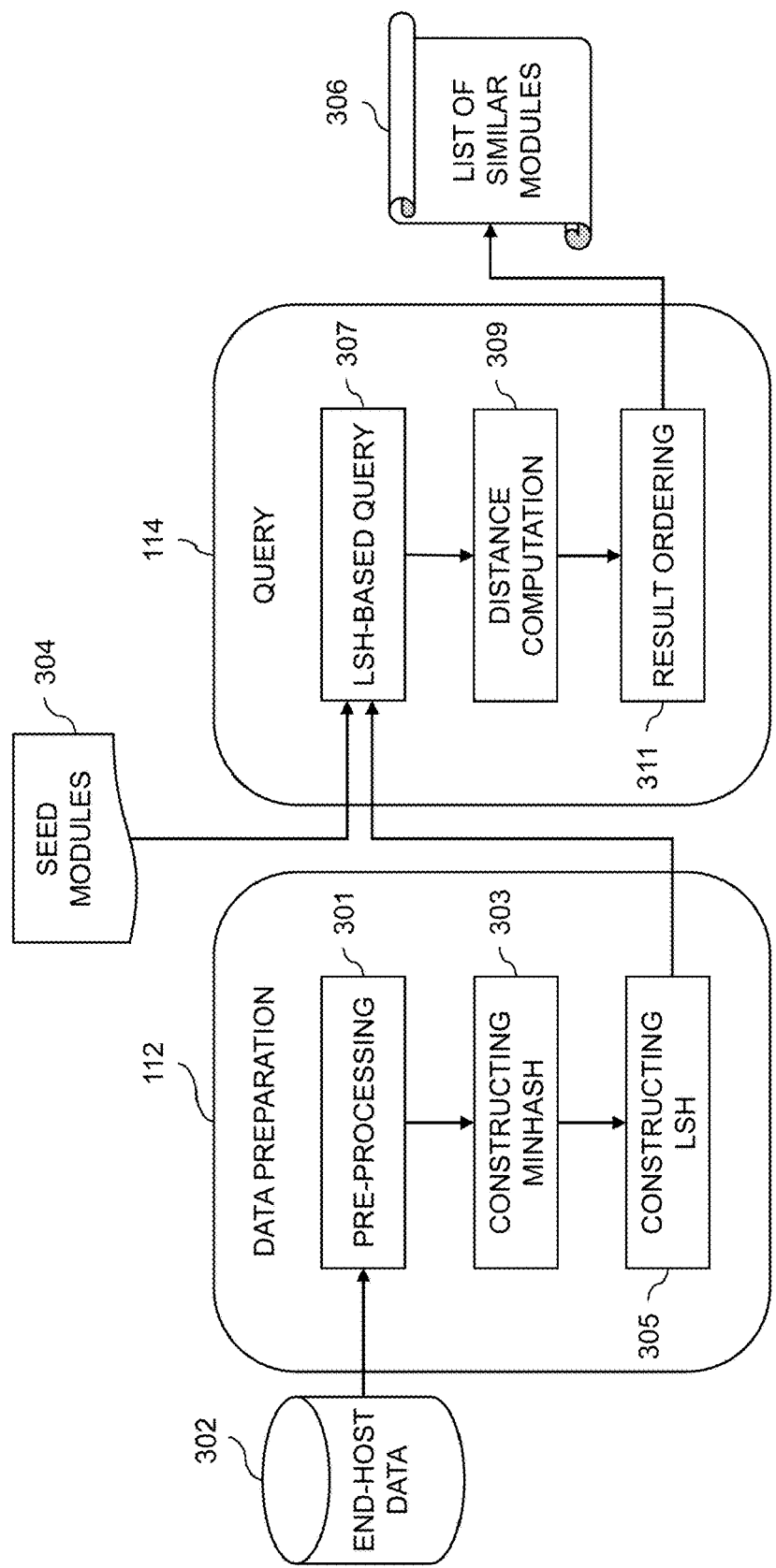
FIG. 3 is a diagram of a query framework for classification of software modules in an illustrative embodiment.

FIG. 3 shows a query framework for classification of software modules, referred to herein as SimQuery. The data preparation module 112 and query module 114 of threat detection and remediation system 110 may be used to implement the SimQuery framework. End-host data 302 is collected from the client devices 104, and provided to the data preparation module 112, which pre-processes 301 the software module data to filter out irrelevant entries, constructs 303 Minhash signatures from a subset of features (denoted as $F_{Sub}$), and constructs 305 LSH from the Minhash signatures to allow for fast querying. Steps 301, 303 and 305, implemented utilizing the data preparation module 112, may be executed regularly, such as daily.

Following processing by the data preparation module 112, processing may proceed in the query module 114, where the SimQuery framework is able to respond to queries issued by analysts or other authorized personnel. Each query may include one or more seed software modules 304. In step 307, an LSH-based query is conducted. The LSH-based query takes Minhash values of a seed software module computed in step 305 and scans all entries to return other software modules hashed to the same bucket under LSH. Various hashing functions and values may be used, such as MD5, SHA1, etc. In some embodiments, the seed software module is a blacklisted or graylisted software module while the other software modules are unknown software modules. The fraction of matched Minhash components is also computed for each returned software module to obtain a similarity score (denoted as Level1 score). The software modules whose Level1 score surpass a threshold (denoted as $TH_{L1}$) are further inspected through distance computation in step 309. In particular, a weighted sum of feature distance in a large feature set (denoted as $F_{All}$) is computed to derive another similarity score (denoted as Level2 score). The Level2 score is then compared to another threshold (denoted as $TH_{L2}$). Software modules are sorted by their Level2 score in step 311, and provided to an analyst via generation of an alert or notification containing a list of similar software modules 306 for the input file hash value for the seed software module. As described above, depending on available resources only a subset of the matched software modules may be provided in the list of similar software modules 306, such as the X matched software modules with the highest Level2 scores. Alternatively, all matched software modules with Level2 scores exceeding the threshold $TH_{L2}$ may be included in the list of similar software modules 306.

Before providing a more detailed discussion of the SimQuery framework, the feature sets $F_{Sub}$ and $F_{All}$ as well as the Minhash and LSH processing will be described.

The endpoint agents on client devices 104 may extract hundreds of features about software modules running on the client devices 104. Such features may be broadly classified into four categories: static, behavioral, contextual and IOC features. Static features may be extracted from a software module's portable executable (PE) header, and include features such as file description, signature, PE timestamp, etc. Behavioral features are related to software module behavior on the host where it is installed, and include features such as accessed files, network connections, changes to registry, etc. Contextual features are collected when a software module is initially installed on a client device, and include features such as installation path, file attributes, auto-start configuration, etc. IOC features are pre-defined signatures that model suspicious behavior or metadata presented by a software module, such as whether a file is unsigned.

The various features collected by endpoint agents on client devices 104 provide a comprehensive view of a software module, but not all of the features are suitable or useful for LSH or other similarity-based querying. In fact, some features are not distinguishable between malicious and legitimate applications. Computation on some features may also be time-consuming. Therefore, a subset of features is used to determine software module similarity. In some embodiments, $F_{Sub}$ includes all IOC features as well as two static features (ImportedDLLCount and SectionNamesCount), since such features have limited value space. $F_{All}$ includes all IOC features as well as seven static features (Description, CompanyName, FileName, Extension, ImportedDLLs, SectionNames and Filesize). It is to be appreciated, however, that in other embodiments different subsets of features may be used for $F_{Sub}$ or $F_{All}$. For example, one or both of $F_{Sub}$ and $F_{All}$ may utilize some but not all available IOC features, or may utilize one or more different or additional static, behavioral or contextual features.

A number of metrics may be used to measure the similarity between a pair of sets. Some metrics, such as Jaccard Distance (i.e., $$\frac{|a \cap b|}{|a \cup b|}$$

for two sets a and b) may involve costly computations in terms of time or computational or storage resources of a device consumed. A Minhash signature is a compact representation of a feature set, and the comparison of two Minhash signatures estimates the actual distance between two features sets. To generate Minhash signatures, all sets should be converted into a characteristic matrix first. A column j of the matrix represents a set j and a row i corresponds to feature i. Element values of the characteristic matrix are 0 or 1. Then, a number of permutations (n) on rows are executed. For each permutation k, the index of the first row in the permuted order in which the column has a 1 is recorded, which is called a Minhash component and denoted herein as $h_k(S)$ where S is one set. The Minhash signature for S is a vector $[h_1(S), h_2(S), \ldots, h_n(S)]$. Through the original sets are compressed after Minhashing, comparing every pair still incurs high overhead. LSH improves the performance by banding r consecutive components into buckets or bands. If two sets fall into one bucket, they are considered as a candidate pair. Examples of a characteristic matrix, Minhash signatures and LSH will be described in further detail below with respect to FIG. 4.

The SimQuery framework of FIG. 3 will now be described in further detail. Pre-processing in step 301 scans all software module entries stored in a central database, such as attack database 108, and removes ones that are irrelevant for this stage of processing. Software modules that do not trigger any IOC, which are most likely benign, are filtered out. Software modules that are not executables or DLLs or other file types of interest are also removed.

Minhash construction in step 303 involves deriving Minhash signatures for the features in subset $F_{Sub}$ from a characteristic matrix whose elements values are either 0 or 1. Each IOC feature can be directly treated as a row in the characteristic matrix, since its value is either true (triggered or 1) or false (0). Static features such as ImportedDLLCount and SectionNamesCount are filled with integer values and are thus converted. It is observed that for most software modules, the value of the features ImportedDLLCount and SectionNamesCount range from 0 to 32 (i.e., a software module usually imports less than 32 DLLs and embodies less than 32 PE sections). Therefore, these static features can be converted into a set of dummy features among which each one represents a single integer value. For instance, 34 dummy features are created for ImportedDLLCount, named $IDC_0, IDC_1, \ldots, IDC_{32}, IDC_{More}$. If ImportedDLLCount equals to i, $IDC_i$ is set to 1, otherwise 0. $IDC_{More}$ is set to 1 when ImportedDLLCount is larger than 32. In a similar manner, the SectionNamesCount feature may be converted into a set of dummy features. While described as using 34 dummy features, embodiments are not limited to this specific number. More or fewer than 34 dummy features may be used depending on the precision desired for converting a static feature into a set of dummy features.

Figure 4:
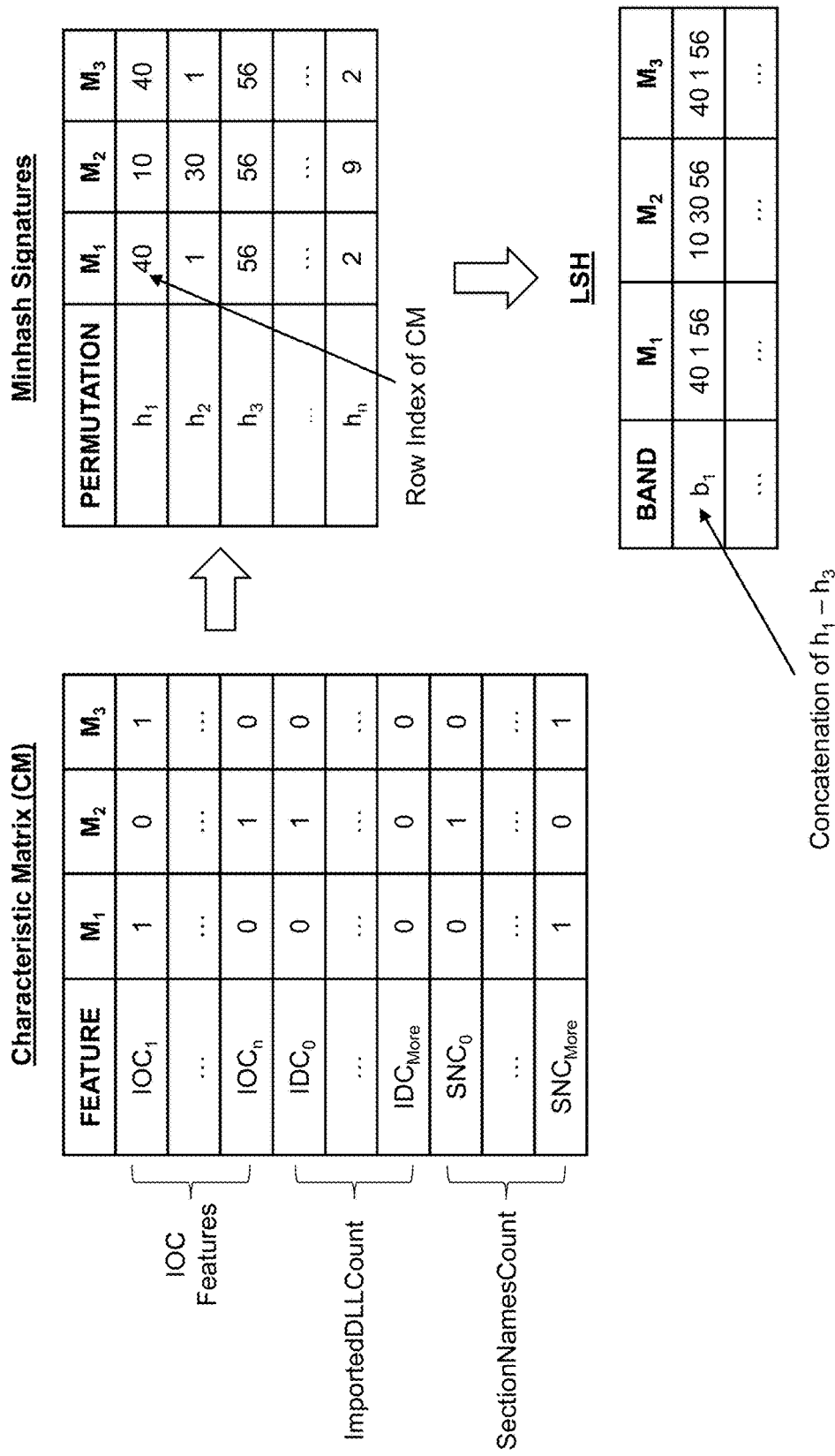
FIG. 4 shows examples of a characteristic matrix, Minhash signatures and locality-sensitive hashing tables in an illustrative embodiment.

After populating the characteristic matrix, each column of the matrix (i.e., each feature vector) is converted into a Minhash signature in step 303 through n permutations. FIG. 4 shows an example of a characteristic matrix (CM) for three software modules, along with Minhash signatures computed from the CM. The software modules are denoted $M_1$, $M_2$ and $M_3$.

Constructing LSH in step 305 considers r consecutive components of a Minhash signature to build a band, and b bands are created where b=ceiling(n/r). The value of one band is the concatenation of the string values of the r components. Selecting the right r can be critical for detection results. For a pair of records with Jaccard Similarity s, the probability of matching one band (i.e., a candidate pair) equals to $1-(1-s^r)^b$. A larger r usually leads to less candidate pairs but more accurate outcomes. The choice of r is discussed in further detail below in the context of evaluation results on a sample dataset. FIG. 4 shows the LSH for a band $b_1$ calculated as a concatenation of Minhash signatures $h_1$-$h_3$.

Steps 301, 303 and 305 prepare a compact representation of the end-host data 302 for fast similarity-based querying, such as the LSH-based query in step 307. When the hash value of a seed software module 304 is inputted, SimQuery first selects the software modules with the same basic metadata and then scans their LSH to output the ones whose LSH matches at least one band. The basic metadata includes, in some embodiments, ModuleType (e.g., executables, libraries, etc.), ModulePlatform (e.g., x86, x64, etc.) and CertFriendlyName (e.g., the owner of the file certificate). In the FIG. 4 example, $M_3$ will be returned if the input or seed software module is $M_1$, as they have the same basic metadata and their first band $b_1$ matches. To increase accuracy, the fraction of matched components may also be computed as a Level1 score and compared with $TH_{L1}$. For instance, if 80 out of 120 of all Minhash components are identical, the Level1 score will be 0.67. The accuracy of SimQuery also depends on the quality of the seed software module. If the seed software module does not trigger enough IOCs, the query will be prone to return benign software modules. As a result, the query module 114 may be configured to generate a prompt or other alert for an analyst if the number of triggered IOCs is less than a threshold $TH_{IOC}$.

Distance computation in step 309 incorporates additional features in the set $F_{All}$, which may include features that cannot fit into a characteristic matrix. Examples of such features include textual features. In step 309, the distance between candidates returned by the LSH-based query in step 307 and the seed software module is computed for such features. Since the number of candidates is usually small after the preceding steps of SimQuery, the distance metric used in step 309 can be more finer-grained. As described above, in some embodiments $F_{All}$ includes all IOC features and 7 static features. The distance can be computed with the equation $$D = \frac{\Sigma(W_i \times F_i)}{\Sigma W_i},$$

where $F_i$ is the distance under feature i and $W_i$ is its weight. In some embodiments, all weights are set to 1 unless the feature value of both software modules is empty or 0 (for IOC features). In such cases, the weight is set to 0. Alternatively, weights can be derived from measuring the distribution of feature values, such as using entropy-based metrics.

How feature distance $F_i$ is computed may be based on the value type of feature i. Assume that $F_i$ is to be computed for two feature values $F_i(S_1)$ and $F_i(S_2)$. For binary features, such as IOC features, binary distance is used, where $F_i=0$ if $F_i(S_1)=F_i(S_2)$ and 1 otherwise. For textual features, such as Description, CompanyName, FileName and Extension, edit distance is used. For features composed of set values, such as ImportedDLLs and SectionNames, Jaccard distance is used. For numeric features, such as Filesize, L1 distance is used, where $$\frac{|F_i(S_1) - F_i(S_2)|}{\max(F_i(S_1), F_i(S_2))}.$$

In some cases, certain distance metrics may be difficult to implement for certain platforms such as structured query language (SQL) databases. In such cases, distance computations may be replaced by a less accurate but simpler metric. For example, binary distance can be applied on textual and set features.

FIG. 5 illustrates distance computation in step 309. More particularly, FIG. 5 shows an example of distance computation for a pair of software modules $M_1$ and $M_2$. For simplicity in the FIG. 5 example, binary distance is used for textual and set features. After the distance (denoted D) is computed, the Level2 score is derived as 1-D. If the Level2 score is above $TH_{L2}$, the software module is added to the output list.

For result ordering in step 311, each software module in the output list has a Level1 score and a Level2 score. The overall score is computed by adding the Level1 and Level2 scores and sorting the output list by the overall score. The ordered result, or some subset thereof, is provided as the list of similar software modules 306.

The above-described techniques will now be further described with respect to evaluation of a sample dataset. Host agents deployed on 40,000 machines were configured to periodically scan the machines and upload results to a centralized server. The results included detailed information on all software modules from the 40,000 machines. The sample dataset is a snapshot of the database containing such results. Software modules triggering one or more IOCs were extracted from the sample dataset, resulting in more than 500,000 software modules to inspect. Among them, 571 were blacklisted or considered as malware, 2,628 were graylisted or considered as PUP, and 62,341 were whitelisted or considered as legitimate by analysts. Still, there were 453,834 unknown software modules to be classified. Using techniques described herein, more than one hundred of these unknown software modules were detected and confirmed as badware. With regards to efficiency, querying one seed software module against the more than 500,000 software modules takes less than one second on average to obtain results using a single laptop. Through exploration of the sample dataset, it was determined that a large number of badware labeled by analysts could be clustered into several groups based on similarity.

The SimQuery framework was utilized to evaluate the sample dataset, which contained information about 519,964 software modules. For each seed software module sent to the SimQuery framework, the number of similar software modules is counted under four categories: blacklisted, graylisted, whitelisted and unknown. All reported whitelisted software modules are false positives and the software modules labeled blacklisted and graylisted are true positives. The reported unknown software modules were validated through a combination of methods. For example, hash values of unknown software modules were sent to VirusTotal, a public and free online file scanning service that runs over 60 antivirus software. A software module is considered malicious if any antivirus software used by VirusTotal alarms on it. Antivirus logs are also leveraged, both from the machines on which host agents were deployed and an internal sandbox environment. If none of the services alarm a software module, the software module is manually inspected to check if it is indeed malicious and related to a seed software module, such as whether the filename shows a similar pattern.

For evaluation of the sample dataset, the number of permutations n for Minhash signature computation was set to 120, and the number of components in one LSH band, r, was set to 5. Thus, the number of bands is 24 (120/5). Several different values of r ranging from 3 to 6 were evaluated for the sample dataset, and the best results were achieved using r=5. The thresholds $TH_{L1}$ and $TH_{L2}$ for the Level1 and Level2 scores, respectively, were set to 0.7 and 0.45 based on empirical analysis. It is to be appreciated, however, that the values of n, r, $TH_{L1}$ and $TH_{L2}$ are not limited to the specific values mentioned above, but rather may be adjusted as desired to fit the needs of a particular implementation. The particular values used may be selected based on tradeoffs relating to accuracy of detection results and the amount of computational resources used or the amount of time consumed for computation.

For the sample dataset, it was determined that when querying a seed software module that triggers less than 3 IOCs, a high volume of false positives were returned. Thus, $TH_{IOC}$ was set to 3 and seed software modules triggering less than 3 IOCs were removed from the seed set, leaving 549 blacklisted software modules (96.1% of all 571 blacklisted software modules) and 1,278 graylisted software modules (48.6% of all 2,628 graylisted software modules). The threshold $TH_{IOC}$, however, is not limited to being 3, but instead may vary as desired for a particular implementation. The SimQuery framework, as discussed above, may be configured to warn the user that setting the value of $TH_{IOC}$ too low will result in more false positives. In some cases, this may be desired especially if an enterprise has the resources to manually investigate larger numbers of software modules reported as suspicious. In other cases, such resources may be limited and thus the value of $TH_{IOC}$ may be increased to produce fewer suspicious software modules to be investigated.

Detection results for querying blacklisted seeds on the sample dataset are shown in FIG. 6, using two combinations of values for $TH_{L1}$ and $TH_{L2}$. In the FIG. 6 table, BL represents blacklisted software modules, GL represents graylisted software modules, WL represents whitelisted software modules, UBad represents unknown software modules confirmed to be badware, and UGood represents unknown software modules confirmed to be benign. Similar abbreviations are used in the table shown in FIG. 9, which will be discussed in further detail below.

When $TH_{L1}=0.7$ and $TH_{L2}=0.45$, the overall accuracy is 68.4% ((235+14+117)/535) and the accuracy within detected unknown software modules is 40.9% (117/(117+169)). False positives were further examined, and it was found that more than half of the false positives (115) were caused by one seed software module not obviously distinguishable from benign software modules. This particular seed software module triggered only 3 IOCs (installed in AppData directory, created during the weekend, and unsigned) and its feature values can be found in other benign software modules. If this seed software module is not queried, the accuracy for unknown software modules rises to 67.6% (113/(113+54)).

Figure 7:
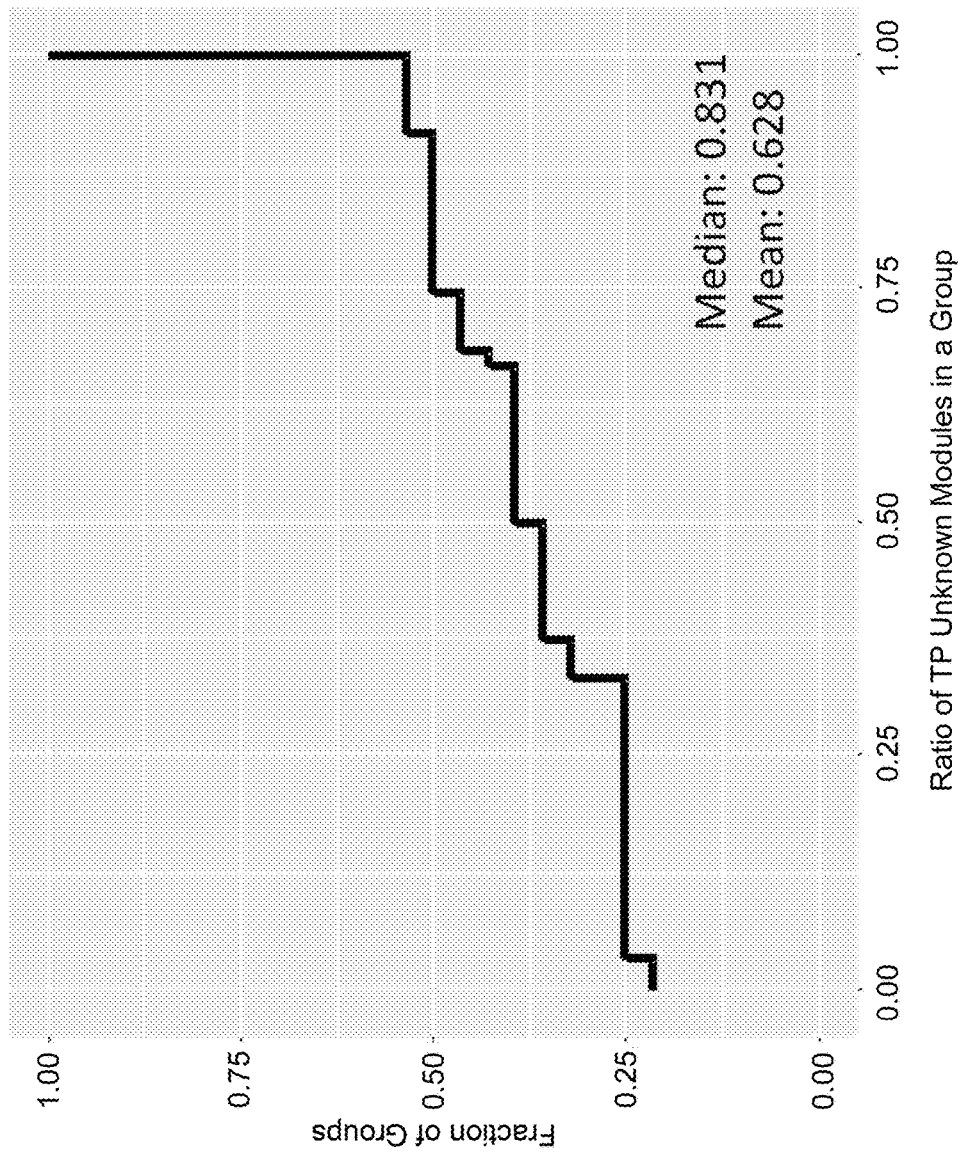
FIG. 7 shows a plot of a true-positive ratio for unknown groups of software modules in an illustrative embodiment.

Results for individual seed software modules queried using the SimQuery framework indicate that a small number of seed software modules lead to detection results for unknown software modules. Among the 549 seed software modules, 402 returned at least one similar software module. Detected unknown software modules, however, are related to a small set of seed software modules for the sample dataset. For the sample dataset, only 28 seed values lead to at least one unknown software module. For each group of similar software modules corresponding to one seed software module, the rate of true positives is computed and an empirical cumulative distribution function (ECDF) was drawn as shown in the plot of FIG. 7. The median rate is 0.831.

Figure 8:
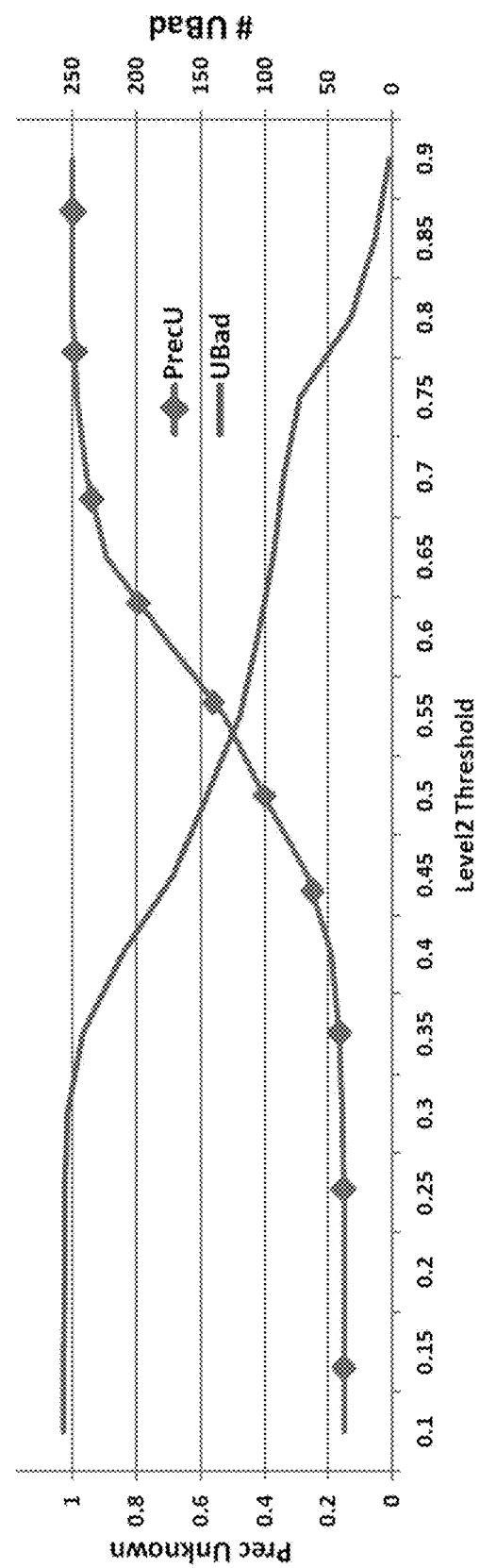
FIG. 8 shows results for unknown software modules using different threshold values in an illustrative embodiment.

When applying different values for $TH_{L1}$ and $TH_{L2}$, detection results can vary significantly. Different combinations of values for $TH_{L1}$ and $TH_{L2}$ were tested, and the best result for the sample dataset was obtained when $TH_{L1}$=0.4 and $TH_{L2}$=0.6 as shown in the FIG. 6 table. Under this setting, 403 software modules were alarmed, and the overall precision and precision on unknown software modules increase to 89.6% and 71.4%, respectively. FIG. 8 shows a plot illustrating the precision on unknown (PrecU) and the number of confirmed unknown software modules (UBad) when different values for $TH_{L2}$ were used on the sample dataset, keeping $TH_{L1}$ set to 0.4.

For querying graylisted software modules as seed software modules, similar results (as those obtained by querying blacklisted software modules as seed software modules) may be obtained using higher values for $TH_{L1}$ and $TH_{L2}$. This is due to the fact that a typical graylisted software module is more likely to be similar to benign software modules as compared with a typical blacklisted software module. For instance, adware is often signed in order to convince a user during installation, while malware tends to install itself silently. FIG. 9 shows a table illustrating results obtained by querying graylisted software modules as seed software modules with $TH_{L1}$=0.7 and $TH_{L2}$=0.8. 593 software modules are prompted, and the accuracies on all and unknown software modules are 85.2% and 55%, respectively.

The SimQuery framework was tested on a laptop with an Intel® i5 CPU, 8 GB memory and running Microsoft® Windows 7. All code for the SimQuery framework was written in R, including code for the data preparation module 112 and the query module 114. The time spent on constructing Minhash signatures and LSH is 182.4 seconds and 875.9 seconds, respectively. Though the overhead is noticeable (17 minutes in total), the impact to daily operation is limited as data preparation can be scheduled regularly, such as daily, at a time when a server or other machine is not busy, such as at night. The query phase does not experience noticeable overhead.

Figure 10:
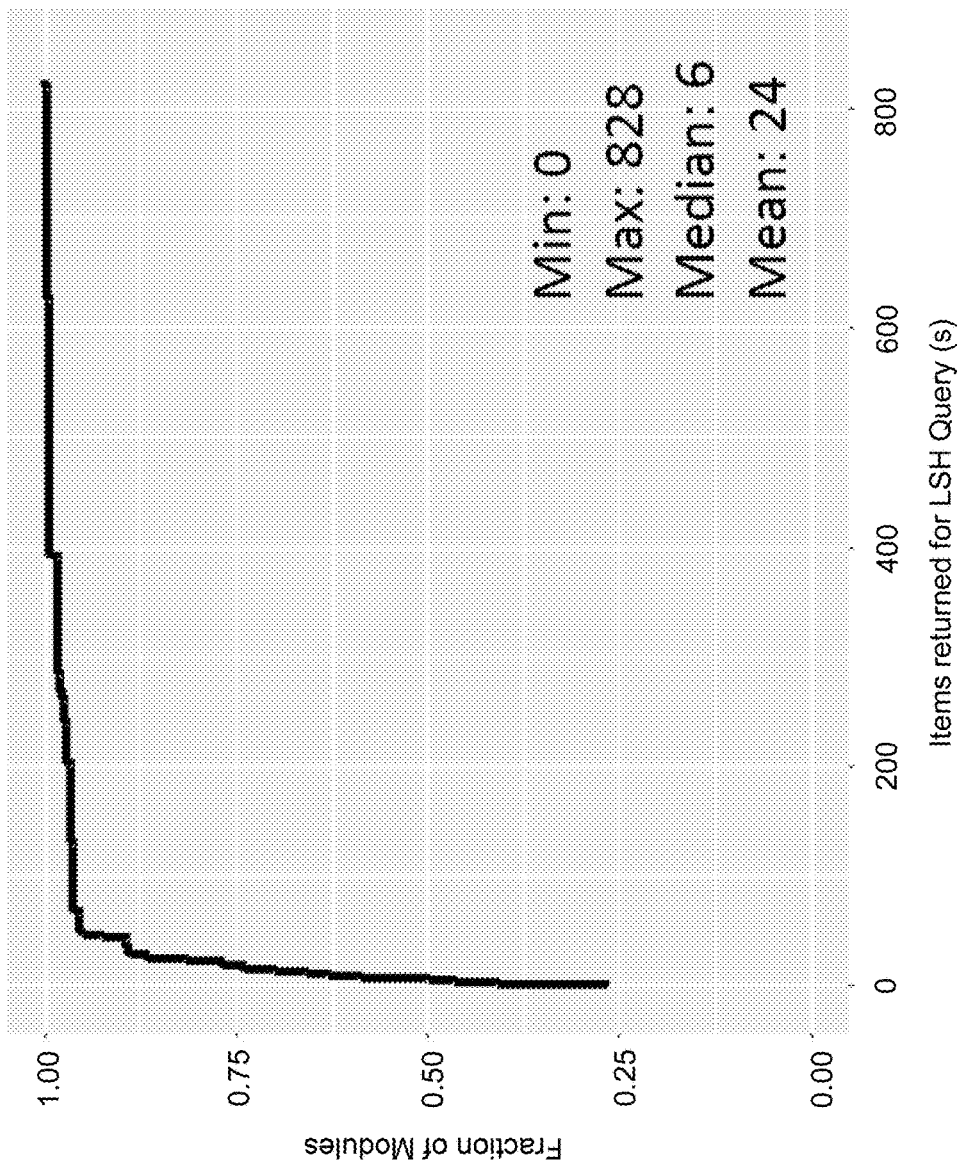
FIG. 10 shows a plot of the distribution of software modules returned by a locality-sensitive hashing query in an illustrative embodiment.
Figure 11:
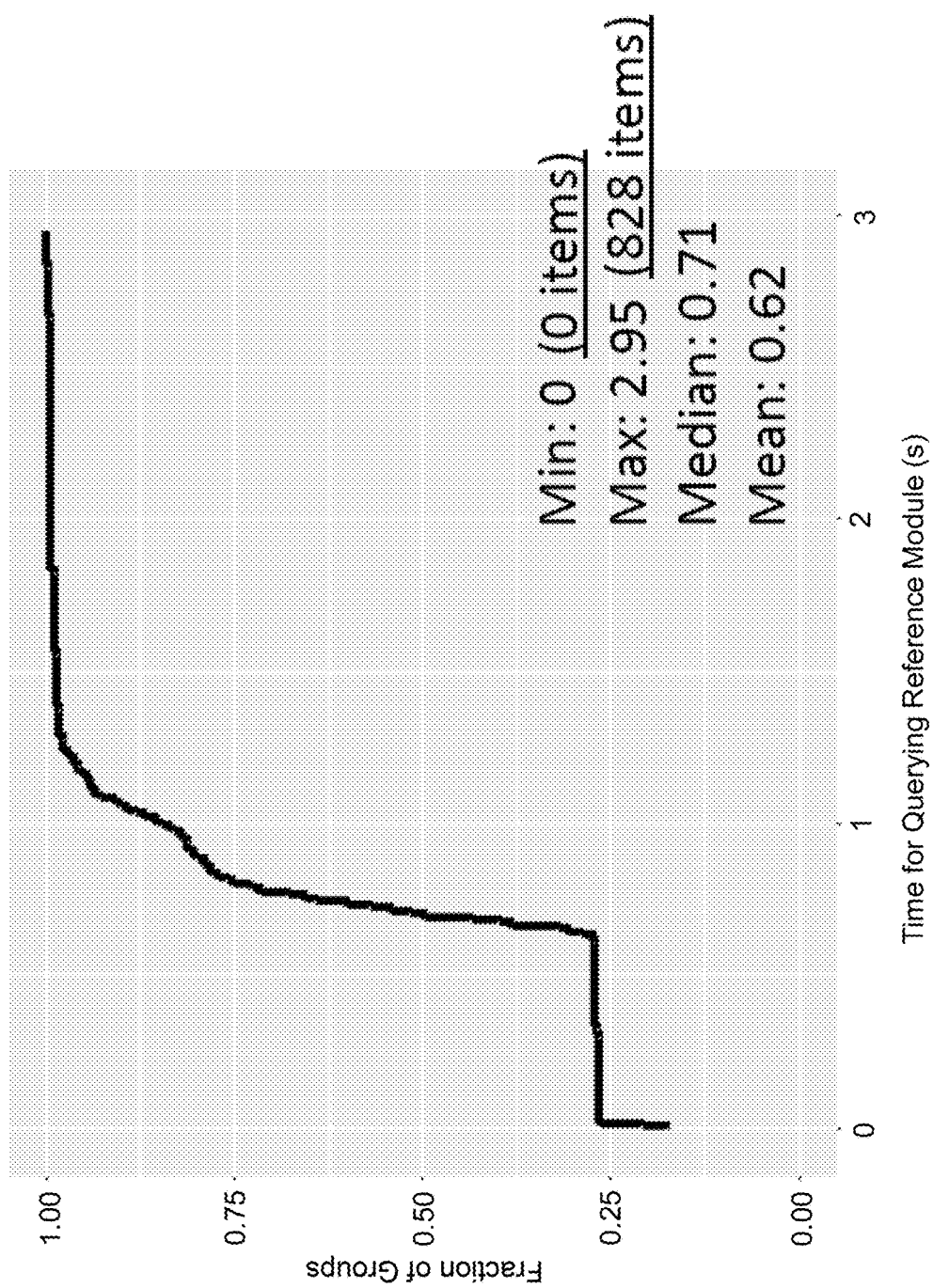
FIG. 11 shows a plot of the latency of a query procedure in an illustrative embodiment.

When a seed software module is queried, the overhead mostly comes from distance computation. Thus, to reduce overhead, the LSH query should be designed such that is does not report a large amount of candidate software modules. The number of returned software modules from an LSH query for each seed is counted and the distribution is plotted as shown in FIG. 10. The maximum number is 828, and the median number is 6. As such, the whole query process is quite responsive. FIG. 11 plots the delay or latency of the whole query procedure. As shown, the maximum delay is only 2.95 seconds and the median delay is 0.71 seconds.

While various embodiments are described above in the context of querying known badware software modules to identify unknown software modules that are similar to the known badware software modules, embodiments are not so limited. In other embodiments, the seed software modules or queried software modules may be whitelisted software modules. The results of the SimQuery framework would thus return unknown software modules likely to be benign. Minhash and LSH may be used, although the features used for $F_{Sub}$ and $F_{All}$, as well as the values of parameters such as $TH_{L1}$, $TH_{L2}$, n, r, etc., may be adjusted. For example, the particular features selected for $F_{Sub}$ and $F_{All}$ should be adjusted relative to the exemplary features used in some embodiments described above. For example, IOC features used in some embodiments described above are more tailored for badware input or seed software modules.

In some embodiments, the seed software modules may be unknown software modules. The similarity-based querying of the SimQuery framework could thus be used to determine the label of an unknown software module. If most of the software modules within the query results are blacklisted or graylisted, the unknown software module is thus likely to be classified as badware. If most of the software modules within the query results are whitelisted, the unknown seed software module is thus likely to be classified as benign. Minhash and LSH may be used, although the features used for $F_{Sub}$ and $F_{All}$, as well as the values of parameters such as $TH_{L1}$, $TH_{L2}$, n, r, etc., may be adjusted.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Google Cloud Platform (GCP) and Microsoft Azure. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
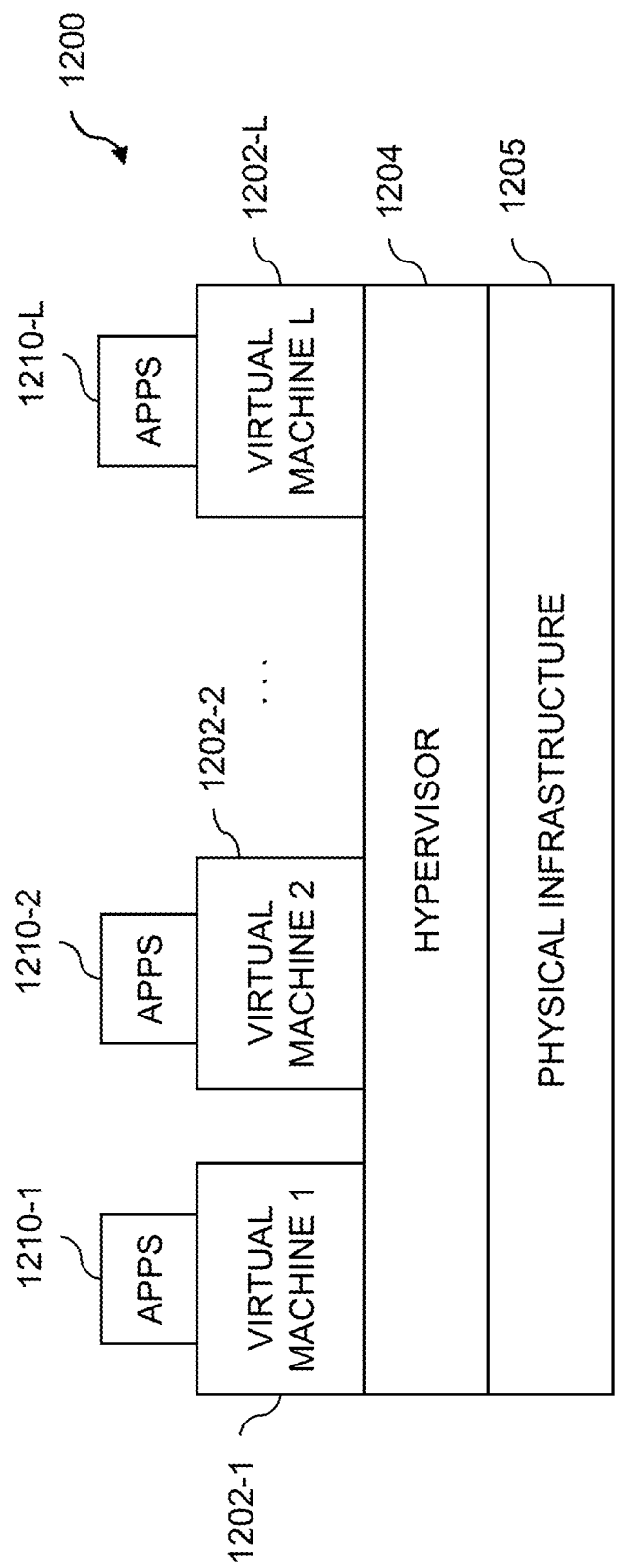

FIG. 12 shows an example processing platform comprising cloud infrastructure 1200. The cloud infrastructure 1200 comprises a combination of physical and virtual processing resources that may be utilized to implement at least a portion of the information processing system 100. The cloud infrastructure 1200 comprises virtual machines (VMs) 1202-1, 1202-2, . . . 1202-L implemented using a hypervisor 1204. The hypervisor 1204 runs on physical infrastructure 1205. The cloud infrastructure 1200 further comprises sets of applications 1210-1, 1210-2, . . . 1210-L running on respective ones of the virtual machines 1202-1, 1202-2, . . . 1202-L under the control of the hypervisor 1204.

Although only a single hypervisor 1204 is shown in the embodiment of FIG. 12, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a hypervisor platform that may be used to implement hypervisor 1204 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA) or other type of processing circuitry, as well as portions or combinations of such circuitry elements.

The memory 1312 may comprise random access memory (RAM), read-only memory (ROM) or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

These and numerous other alternative cloud computing environments or other types of processing platforms can be configured to implement functionality for classifying software modules as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality described herein for classifying software modules are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems in which it is desirable to provide the classification functionality described herein. Also, the particular configurations of system and device elements shown in the figures can be varied in other embodiments. Thus, for example, the particular type of software modules deployed in a given embodiment and their respective configurations may be varied. Other features of the illustrative embodiments can also be varied. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A method comprising:
   preparing a representation of data associated with a plurality of software modules, the representation comprising similarity-based hashing of signatures constructed from a first subset of features of the plurality of software modules, the first subset of features of the plurality of software modules comprising at least one of (i) one or more indicator of compromise features having a binary value range and (ii) one or more static features having an integer value range;
   receiving a seed software module;
   performing a similarity-based query utilizing the similarity-based hashing of signatures constructed from the first subset of features to identify one or more of the plurality of software modules as candidate software modules matching the seed software module;
   computing distances between the candidate software modules and the seed software module utilizing a second subset of features of the plurality of software modules, at least one of the second subset of features comprising a textual feature;
   classifying one or more of the candidate software modules as a designated software module type based on the computed distances;
   generating a notification comprising a list of the candidate software modules classified as the designated software module type; and
   modifying access by a given one of one or more client devices associated with an enterprise to a given one of the one or more of the candidate software modules in the list classified as the designated software module type;
   wherein preparing the representation of data associated with the plurality of software modules comprises:
      building a characteristic matrix having two or more rows each corresponding to one of the first subset of features;
      converting each column of the characteristic matrix into a hash signature through a designated number of permutations; and
      generating the similarity-based hashing of signatures by performing locality-sensitive hashing to build two or more bands of consecutive components of the hash signatures, each band comprising a concatenation of string values of two or more consecutive components of the hash signatures;

wherein the method is performed by at least one processing device comprising a processor coupled to a memory.

2. The method of claim 1 further comprising:
receiving data associated with the plurality of software modules from a plurality of client devices associated with the enterprise; and
filtering the received data to remove one or more of the plurality of software modules that do not trigger one or more specified conditions and that are not of one or more specified types.

3. The method of claim 2 wherein the one or more specified conditions comprises triggering a threshold number of indicators of compromise and the one or more specified types comprises executable modules and dynamic link library modules.

4. The method of claim 1 wherein the hash signatures comprise Minhash signatures.

5. The method of claim 1 wherein performing the similarity-based query comprises performing a locality-sensitive hashing query matching one or more bands of the seed software module with corresponding bands of the plurality of software modules, and wherein the candidate software modules comprise respective ones of the plurality of software modules matching a designated threshold number of bands with the seed software module.

6. The method of claim 1 further comprising, prior to performing the similarity-based query, filtering out one or more of the plurality of software modules having one or more defined metadata types that do not match corresponding metadata types of the seed software module.

7. The method of claim 6 wherein the one or more defined metadata types comprise at least one of a module type, a module platform, and a certificate owner.

8. The method of claim 1 wherein computing the distances between the candidate software modules and the seed software module comprises computing distances between the candidate software modules and the seed software module for respective features in the second subset of features and summing the distances to determine distance metrics for respective ones of the candidate software modules.

9. The method of claim 8 wherein classifying a given one of the candidate modules as being the designated software module type comprises determining that the distance metric for the given candidate module exceeds a designated threshold.

10. The method of claim 1 wherein the designated software module type comprises malware.

11. The method of claim 1 wherein the designated software module type comprises potentially unwanted programs.

12. The method of claim 1 wherein generating the notification comprises ordering the list of candidate software modules classified as the designated software module type based on the computed distances between the candidate software modules and the seed software module.

13. The method of claim 1 wherein modifying access by the given client device to the given candidate software module classified as the designated software module type comprises at least one of:
removing the given candidate software module from a memory or storage of the given client device;
preventing the given client device from obtaining the given candidate software module; and
causing the given candidate software module to be opened in a sandboxed application environment on the given client device.

14. The method of claim 1 further comprising providing the notification over at least one network to one or more designated users of the enterprise.

15. A method comprising:
preparing a representation of data associated with a plurality of software modules, the representation comprising similarity-based hashing of signatures constructed from a first subset of features of the plurality of software modules, the first subset of features of the plurality of software modules comprising at least one of (i) one or more indicator of compromise features having a binary value range and (ii) one or more static features having an integer value range;
receiving a seed software module;
performing a similarity-based query utilizing the similarity-based hashing of signatures constructed from the first subset of features to identify one or more of the plurality of software modules as candidate software modules matching the seed software module;
computing distances between the candidate software modules and the seed software module utilizing a second subset of features of the plurality of software modules, at least one of the second subset of features comprising a textual feature;
classifying one or more of the candidate software modules as a designated software module type based on the computed distances;
generating a notification comprising a list of the candidate software modules classified as the designated software module type; and
modifying access by a given one of one or more client devices associated with an enterprise to a given one of the one or more of the candidate software modules in the list classified as the designated software module type;
wherein preparing the representation of data associated with the plurality of software modules comprises:
building a characteristic matrix having two or more rows each corresponding to one of the first subset of features; and
converting each column of the characteristic matrix into a hash signature through a designated number of permutations;
wherein the first subset of the plurality of features comprises at least one feature having a binary value range and at least one feature having an associated integer value range, and wherein each feature in the first subset having a binary value range is associated with a single row in the characteristic matrix and each feature in the first subset having an integer value range is associated with two or more rows of the characteristic matrix corresponding to different integer values in its associated integer value range; and
wherein the method is performed by at least one processing device comprising a processor coupled to a memory.

16. The method of claim 15 wherein preparing the representation further comprises generating the similarity-based hashing of signatures by performing locality-sensitive hashing to build two or more bands of consecutive components of the hash signatures, each band comprising a concatenation of string values of two or more consecutive components of the hash signatures.

17. A computer program product comprising a non-transitory processor-readable storage medium having stored therein program code of one or more software programs, wherein the program code when executed by at least one processing device cause the at least one processing device:
  to prepare a representation of data associated with a plurality of software modules, the representation comprising similarity-based hashing of signatures constructed from a first subset of features of the plurality of software modules, the first subset of features of the plurality of software modules comprising at least one of (i) one or more indicator of compromise features having a binary value range and (ii) one or more static features having an integer value range;
  to receive a seed software module;
  to perform a similarity-based query utilizing the similarity-based hashing of signatures constructed from the first subset of features to identify one or more of the plurality of software modules as candidate software modules matching the seed software module;
  to compute distances between the candidate software modules and the seed software module utilizing a second subset of features of the plurality of software modules, at least one of the second subset of features comprising a textual feature;
  to classify one or more of the candidate software modules as a designated software module type based on the computed distances;
  to generate a notification comprising a list of the candidate software modules classified as the designated software module type; and
  to modify access by a given one of one or more client devices associated with an enterprise to a given one of the one or more of the candidate software modules in the list classified as the designated software module type
  wherein preparing the representation of data associated with the plurality of software modules comprises:
    building a characteristic matrix having two or more rows each corresponding to one of the first subset of features;
    converting each column of the characteristic matrix into a hash signature through a designated number of permutations; and
    generating the similarity-based hashing of signatures by performing locality-sensitive hashing to build two or more bands of consecutive components of the hash signatures, each band comprising a concatenation of string values of two or more consecutive components of the hash signatures.

18. The computer program product of claim 17 wherein:
performing the similarity-based query comprises performing a locality-sensitive hashing query matching one or more bands of the seed software module with corresponding bands of the plurality of software modules; and
the candidate software modules comprise respective ones of the plurality of software modules matching a designated threshold number of bands with the seed software module.

19. An apparatus comprising:
at least one processing device comprising a processor coupled to a memory;
the at least one processing device being configured:
  to prepare a representation of data associated with a plurality of software modules, the representation comprising similarity-based hashing of signatures constructed from a first subset of features of the plurality of software modules, the first subset of features of the plurality of software modules comprising at least one of (i) one or more indicator of compromise features having a binary value range and (ii) one or more static features having an integer value range;
  to receive a seed software module;
  to perform a similarity-based query utilizing the similarity-based hashing of signatures constructed from the first subset of features to identify one or more of the plurality of software modules as candidate software modules matching the seed software module;
  to compute distances between the candidate software modules and the seed software module utilizing a second subset of features of the plurality of software modules, at least one of the second subset of features comprising a textual feature;
  to classify one or more of the candidate software modules as a designated software module type based on the computed distances;
  to generate a notification comprising a list of the candidate software modules classified as the designated software module type; and
  to modify access by a given one of one or more client devices associated with an enterprise to a given one of the one or more of the candidate software modules in the list classified as the designated software module type;
wherein preparing the representation of data associated with the plurality of software modules comprises:
  building a characteristic matrix having two or more rows each corresponding to one of the first subset of features;
  converting each column of the characteristic matrix into a hash signature through a designated number of permutations; and
  generating the similarity-based hashing of signatures by performing locality-sensitive hashing to build two or more bands of consecutive components of the hash signatures, each band comprising a concatenation of string values of two or more consecutive components of the hash signatures.

20. The apparatus of claim 19 wherein:
performing the similarity-based query comprises performing a locality-sensitive hashing query matching one or more bands of the seed software module with corresponding bands of the plurality of software modules; and
the candidate software modules comprise respective ones of the plurality of software modules matching a designated threshold number of bands with the seed software module.

* * * * *